UNITED STATES PATENT OFFICE.

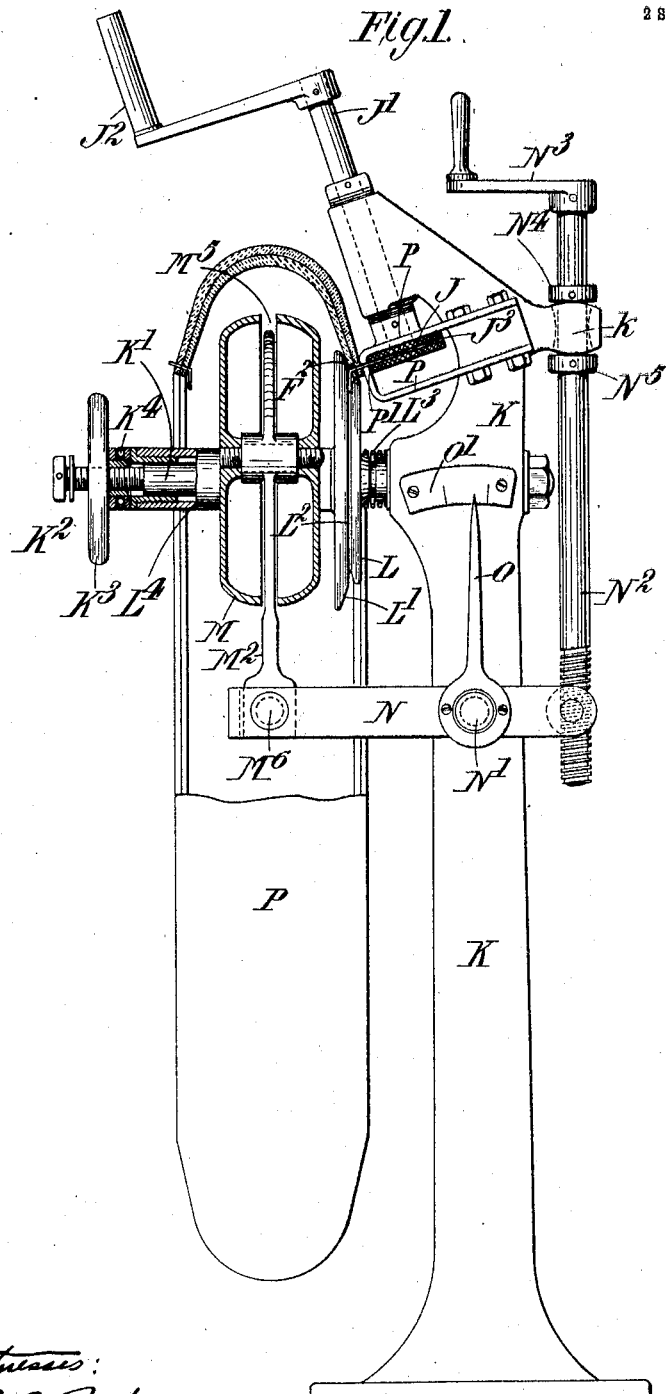

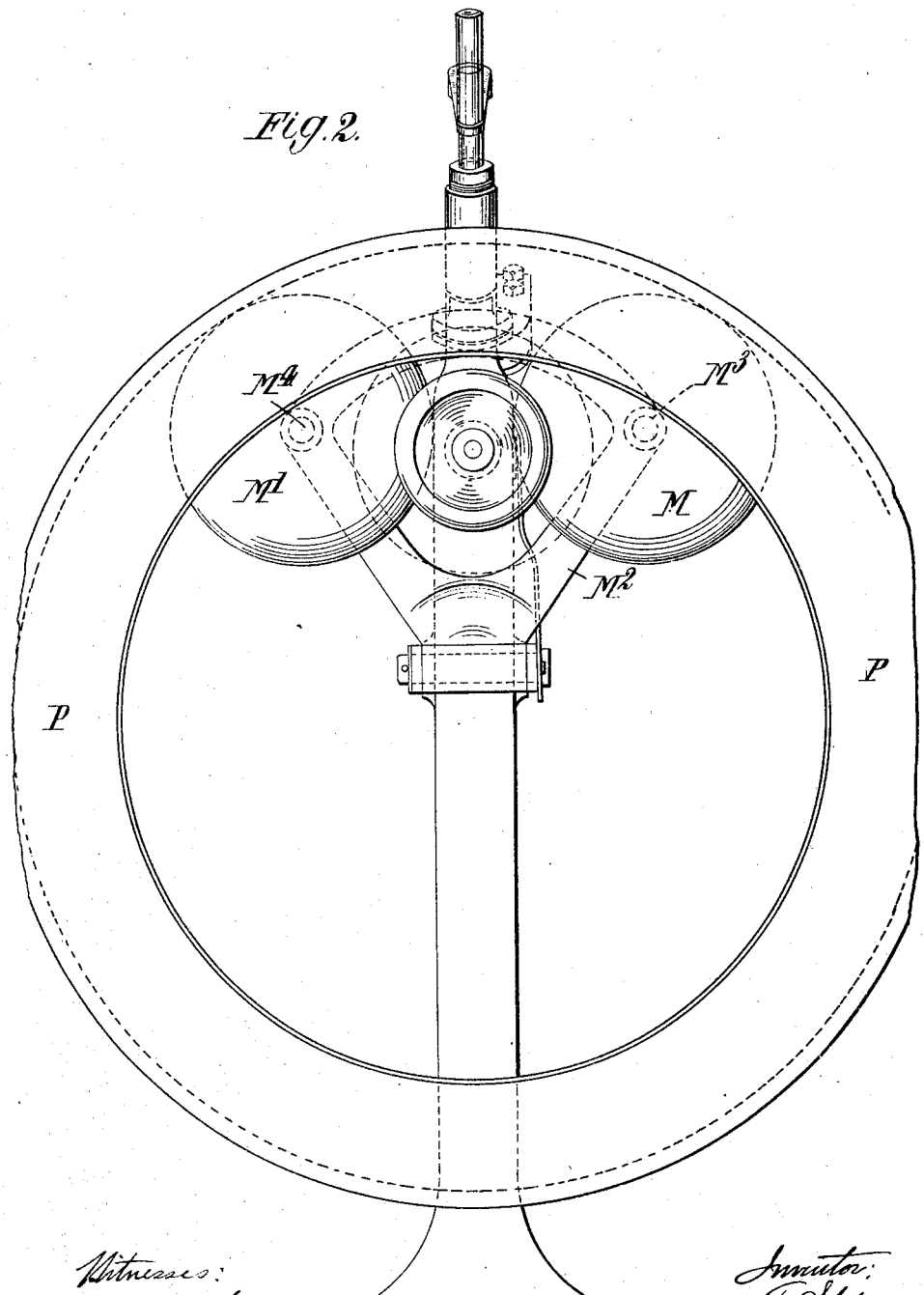

THOMAS SLOPER, OF DEVIZES, ENGLAND.

MECHANISM FOR MANUFACTURING PNEUMATIC TIRES.

961,172.

Specification of Letters Patent. Patented June 14, 1910.

Application filed February 12, 1910. Serial No. 543,602.

*To all whom it may concern:*

Be it known that I, THOMAS SLOPER, a subject of the King of England, residing at Devizes, in Wiltshire, England, have invented certain new and useful Improvements in Mechanism for Manufacturing Pneumatic Tires, of which the following is a specification.

This invention is for mechanism for manufacturing tires and has particular reference to the consolidation of the fabric composing the tire after the latter has been removed from the "former" whereon it has been built up.

As is well-known tires are often made by building up layers of material upon an annular "former" having the shape which the tire is finally to assume, then after the layers of material have been superimposed the whole or part of the fabric in many cases requires to be consolidated. This may be done by rolling it down while on the "former", but the object of the present invention is to provide means for effecting the consolidation, particularly of the edges of the tire, after the tire has been removed from the "former."

The invention is especially applicable to tires built up of cords placed around staples or pins (hereinafter referred to as pins only) disposed at what finally constitute the edges of the tire and which pins are employed to anchor the cords to the beads. As is well-known, the pins for this purpose are carried by the "former" in such way that they are sufficiently firm to permit the building up of the tire, but can be withdrawn with the tire after the building up has been effected.

It is found that after laying the cord over the pins, so that they extend through and project beyond the cords, the latter require to be driven home upon the pins. This driving home consolidates the edges of the tire and prepares them for the reception of the beads and as already stated, the object of the present invention is to provide means for effecting the consolidation after the tire has been removed from the "former."

Broadly this invention consists in the employment, for the purpose of treating a tire after its removal from the "former" whereon it has been built up, of supports that suspend between them the portion of the tire to be operated upon, means for applying pressure to or consolidating the fabric at the suspended portion of the tire and means for advancing the tire to bring different parts under the operation of the pressure applying or consolidating means.

The supports conveniently take the form of two rollers over which the tire is hung so that a slack portion is suspended between them and the means for consolidating the fabric preferably take the form of a pressing roller that coöperates with a bedding roller. These two rollers are situated in such position that they can operate upon the suspended portion of the tire, that is the part which lies between the supporting rollers. For operation upon the edge of the tire they are set at a different angle from the supporting rollers so as to correspond to the position the edge of the tire assumes when carried on the supporting rollers and it will be seen that the suspended portion of the tire being free, allows the edge to be readily guided under the presser roller.

For treating tires built up of cord as described, the presser roller is constructed with a lip or edge that may bear upon the tire close to the pins.

In the accompanying drawings, which illustrate one method of carrying out this invention:—Figure 1 is a side elevation of the machine showing some parts in section for the sake of clearness and Fig. 2 is a front elevation of the same.

Like letters indicate like parts throughout the drawings.

The tire P which is to be operated upon is carried by supporting rollers M M¹ that are pivoted at M³ M⁴ respectively to a frame M²; each roller is divided at M⁵ to admit the frame. To press the material of the tire P home upon the pins F², a pressing roller J is employed. This roller has a channel J³ which may either be provided by grooving the roller, or the roller may consist of a double roller having a space between the two parts that provides the requisite channel. The roller is carried on a spindle J¹ rotatably mounted in a standard K and is situated opposite that part of the tire that is suspended between the two rollers M M¹. The spindle J¹ has a handle J² by which it can be turned. Opposite the pressing roller J, and set at a suitable angle thereto, is a bedding roller L having a bedding face L¹ and a circumferential groove

L². This roller is rotatably mounted on a spindle K¹ that is rigidly secured to the standard K and is controlled by a spring L³ that always tends to move it in a direction away from the pressing roller J. That end of the spindle K¹ remote from the standard K is screw-threaded as shown at K² and threaded on to this screw-threaded portion is a wheel K³. A ball-bearing K⁴ is introduced between the wheel and a sleeve L⁴ that extends from the bedding roller L and is concentric with the spindle K¹.

The frame M² is hinged at M⁶ to a rocking arm N. This arm is pivoted at N¹ to the standard and has at one end engagement with a screw-threaded spindle N². The spindle passes through a lug k on the standard K and has at its upper end a handle N³. The spindle can rotate in the lug k and is provided with collars N⁴ N⁵ on opposite sides of it to prevent endwise displacement. On the rocking arm N and concentric with the pivot N¹ is a pointer or indicator O that registers against a scale O¹ on the standard K.

The operation of this apparatus is as follows:—The detached tire P is placed over the supporting rollers M, M¹, which latter engage the concave portion of the tire, that is, the inner side opposite the tread. The rollers M, M¹ are then raised or lowered by rotating the spindle N² in one direction or the other by the handle N³. The rotation of the spindle causes that end of the arm N which is in engagement with it to rise or fall according to the direction of the rotation and thereby the frame M² is lowered or raised. The adjustment of the supporting rollers has to be such that the edge of the tire will lie easily upon the bedding roller and the inner ends of the pins will enter the groove L² of the same. This position will be always the same for a given size of tire and consequently the scale O¹ may be marked to represent various sizes so that the operator may immediately adjust his machine by rotating the handle N³ until the indicator O, which moves with the rocking arm N, is opposite the indication on the scale corresponding to the size of tire upon which he is to operate.

Having adjusted the tire upon the machine, the wheel K³ is rotated in such manner as to advance the bedding roller L toward the pressing roller J and the pins F² of the tire are made to enter the channel J³ of the roller. When the bedding roller has been advanced sufficiently to bring the requisite pressure to bear upon the material, the roller J is rotated by means of the handle J². This causes the roller to drive the tire around upon the bedding roller L and the supporting rollers M, M¹, whereby the whole of the edge of the tire is passed in succession between the pressing and bedding rollers, the bedding face L¹ of the latter always presenting a firm backing for the material, and this together with the groove L² serves to present the material in proper position for the operation of the pressing roller. A fixed guide P is provided on the feed side of the roller. The guide is slotted at P¹ to allow the passage of the pins F², so that the pins traversing the slot P¹ are, with the edge of the tire, brought by the guide into proper line with the roller and its channel J³ as the tire is advanced to the roller. It will be seen that as the portion of the tire operated upon by the roller J is suspended between the rollers M M¹ and the whole tire is flexible, the part operated upon can be readily guided into place.

What I claim as my invention and desire to secure by Letters Patent is:—

1. In mechanism for treating a tire after its removal from the "former" whereon it has been built up, the combination of, supports that suspend between them the portion of the tire to be operated upon, means for applying pressure to the fabric at the suspended portion of the tire, and means for advancing the tire to bring different parts under the operation of the pressure applying means, substantially as set forth.

2. In mechanism for treating a tire after its removal from the "former" whereon it has been built up, the combination of, supports that suspend between them the portion of the tire to be operated upon, means for applying pressure to the fabric at the edge of the suspended portion of the tire, and means for advancing the tire to bring different portions of the edge in succession under the operation of the pressure applying means, substantially as set forth.

3. In mechanism for treating a tire after its removal from the "former" whereon it has been built up, the combination of, two supporting rollers disposed one in front of the other and at such distance apart that the tire can be hung over both of them simultaneously, means for applying pressure to the fabric at that portion of the tire that is suspended between the two supporting rollers, and means for advancing the tire to bring different parts under the operation of the pressure applying means, substantially as set forth.

4. In mechanism for treating a tire after its removal from the "former" whereon it has been built up, the combination of, two supports disposed one in front of the other and at such distance apart that the tire can be hung over both of them simultaneously, a pressing roller so situated that it can operate upon the portion of the tire suspended between the supports, a bedding roller opposed to the pressing roller and having a bedding face whereon the suspended portion of the tire may be presented to the pressing roller, and means for causing the pressing roller to traverse the tire, substantially as set forth.

5. In mechanism for treating a tire after its removal from the "former" whereon it has been built up, the combination of, two supporting rollers disposed one in front of the other and at such distance apart that the tire can be hung over both of them simultaneously, a pressing roller so situated as to operate upon the edge of that portion of the tire that is suspended between the two supporting rollers and disposed at a different angle to that of the supporting rollers so as to correspond to the plane in which the edge of the tire lies, a bedding roller opposed to the pressing roller and having a bedding face whereon the suspended portion of the tire may be presented to the pressing roller, and means for causing the pressing roller to traverse the edge of the tire, substantially as set forth.

6. In mechanism for manufacturing tires that are built up of lengths of material looped over pins and for treating such a tire after its removal from the "former" whereon it has been built up, the combination of, supports that suspend between them the portion of the tire to be operated upon, a pressing roller so situated as to operate upon the edge of that portion of the tire that is suspended between the supports, a bedding roller opposed to the pressing roller and having a bedding face whereon such suspended portion of the tire is presented to the pressing roller in such position that the edge of the latter may bear upon the tire close to the pins, and means for causing the pressing roller to traverse the edge of the tire beside the pins, substantially as set forth.

7. In mechanism for manufacturing tires that are built up of lengths of material looped over pins and for treating such a tire after its removal from the "former" whereon it has been built up, the combination of, supports that suspend between them the portion of the tire to be operated upon, a pressing roller so situated as to operate upon the edge of that portion of the tire that is suspended between the supports, a bedding roller opposed to the pressing roller and having a bedding face whereon such suspended portion of the tire is presented to the pressing roller in such position that the edge of the latter may bear upon the tire close to the pins, means for causing the pressing roller to traverse the edge of the tire beside the pins, and a fixed guide on the feed side of the pressing roller slotted to receive the pins so that they may be guided and thus the edge of the tire guided relatively to the pressing roller, substantially as set forth.

8. In mechanism for manufacturing tires that are built up of lengths of material looped over pins that project from both sides of the fabric and for treating such a tire after its removal from the "former" whereon it is built up, the combination of, supports for the tire which suspend between them the portion of the tire to be operated upon, a pressing roller so situated as to operate upon one face of the edge of that portion of the tire that is suspended between the supports, a bedding roller opposed to the pressing roller and having a bedding face whereon the suspended portion of the tire may be presented to the pressing roller such bedding face being grooved to receive those portions of the pins that project on the other face of the tire, and means for causing the pressing roller to traverse the edge of the tire, substantially as set forth.

9. In mechanism for manufacturing tires that are built up of lengths of material looped over pins that project from both sides of the fabric and for treating such a tire after its removal from the "former" whereon it is built up, the combination of, supports for the tire which suspend between them the portion of the tire to be operated upon, a pressing roller so situated as to operate upon one face of the edge of that portion of the tire that is suspended between the supports, a bedding roller opposed to the pressing roller and having a bedding face whereon the suspended portion of the tire may be presented to the pressing roller such bedding face being grooved to receive those portions of the pins that project on the other face of the tire, a fixed guide on the feed side of the roller, such guide being slotted to receive those portions of the pins that project from the outer face of the tire in order that these may be guided relatively to the pressing roller, and means for causing the pressing roller to traverse the edge of the tire, substantially as set forth.

10. In mechanism for manufacturing tires that are built up of lengths of material looped over pins that project from the fabric and for treating such a tire after its removal from the "former" whereon it is built up, the combination of, supports for the tire which suspend between them the portion of the tire to be operated upon, a pressing roller so situated as to operate upon one face of the edge of that portion of the tire that is suspended between the supports the roller having in its face a channel to admit those portions of the pins that project on that face of the tire, a bedding roller opposed to the pressing roller and having a bedding face whereon the suspended portion of the tire may be presented to the pressing roller, and means for causing the pressing roller to traverse the edge of the tire, substantially as set forth.

11. In mechanism for manufacturing tires that are built up of lengths of material looped over pins that project from both sides of the fabric and for treating such a tire after its removal from the "former" whereon it is built up, the combination of, supports for the tire which suspend between them the portion of the tire to be operated upon, a pressing roller so situated as to operate upon one face of the edge of that portion of the tire that is suspended between the supports and having a channel in its face to receive the pins projecting from that face of the tire, a bedding roller opposed to the pressing roller and having a bedding face whereon the suspended portion of the tire may be presented to the pressing roller such bedding face having in it a channel to receive those portions of the pins that project on the other face of the tire, and means for causing the pressing roller to traverse the edge of the tire, substantially as set forth.

12. In mechanism for treating a tire after its removal from the "former" whereon it has been built up, the combination of, supports that suspend between them the portion of the tire to be operated upon, a carrier for the supports, means for applying pressure to the fabric at the suspended portion of the tire, means for raising or lowering the carrier to adjust the supports relatively to the pressure-applying means, and means for advancing the tire to bring different parts under the operation of the pressure-applying means, substantially as set forth.

13. In mechanism for treating a tire after its removal from the "former" whereon it has been built up, the combination of, two supporting rollers disposed one in front of the other and at such a distance apart that the tire can be hung over both of them simultaneously, a frame carrying the supporting rollers, means for applying pressure to the fabric at the suspended portion of the tire, means for raising or lowering the frame carrying the supporting rollers so that these may be adjusted relatively to the pressure-applying means, and means for advancing the tire to bring different parts under the operation of the pressure-applying means, substantially as set forth.

14. In mechanism for treating a tire after its removal from the "former" whereon it has been built up, the combination of, two supporting rollers disposed one in front of the other and at such a distance apart that the tire can be hung over both of them simultaneously, a frame carrying the supporting rollers, means for applying pressure to the fabric at the suspended portion of the tire, means for raising or lowering the frame carrying the supporting rollers so that these may be adjusted relatively to the pressure-applying means, an index and scale for indicating the position to which the frame has been or should be adjusted according to the size of the tire under manufacture, and means for advancing the tire to bring different parts under the operation of the pressure-applying means, substantially as set forth.

In testimony whereof I have signed my name to this specification in the presence of two subscribing witnesses.

THOMAS SLOPER.

Witnesses:
H. PARSONS,
W. J. LYTHERLEIGH.